(12) United States Patent
    Constant

(10) Patent No.: US 10,426,079 B2
(45) Date of Patent: Oct. 1, 2019

(54) DECLUTCHING DEVICE FOR DISTRIBUTION ELEMENT AND SEED DRILL INCLUDING SUCH A DEVICE

(71) Applicant: KUHN S.A., Saverne (FR)

(72) Inventor: Olivier Constant, Weiterswiller (FR)

(73) Assignee: KUHN S.A., Saverne (FR)

( * ) Notice: Subject to any disclaimer, the term of this patent is extended or adjusted under 35 U.S.C. 154(b) by 319 days.

(21) Appl. No.: 15/296,422

(22) Filed: Oct. 18, 2016

(65) Prior Publication Data
    US 2017/0112048 A1    Apr. 27, 2017

(30) Foreign Application Priority Data
    Oct. 22, 2015  (FR) ...................................... 15 60069

(51) Int. Cl.
    | A01C 19/00 | (2006.01) |
    | A01C 7/08 | (2006.01) |
    | A01C 7/12 | (2006.01) |
    | G05G 1/04 | (2006.01) |
    | G05G 5/05 | (2006.01) |

(52) U.S. Cl.
    CPC .............. *A01C 19/00* (2013.01); *A01C 7/087* (2013.01); *A01C 7/088* (2013.01); *A01C 7/12* (2013.01); *G05G 1/04* (2013.01); *G05G 5/05* (2013.01)

(58) Field of Classification Search
    CPC ........... A01C 19/00; A01C 7/087; A01C 7/10; A01C 7/088; A01C 7/12; G05G 5/05; G05G 1/04
    See application file for complete search history.

(56) References Cited

U.S. PATENT DOCUMENTS 4,289,256 A * 9/1981 Bailey .................... A01C 7/087
                                                          111/25
4,550,860 A * 11/1985 Weeder .................. A01C 19/00
                                                          111/69
6,240,861 B1   6/2001 Memory

FOREIGN PATENT DOCUMENTS

| EP | 0 471 155 A1 | 2/1992 | |
| EP | 0471155 A1 * | 2/1992 | ............. A01C 7/122 |
| EP | 0 705 533 A2 | 4/1996 | |

OTHER PUBLICATIONS translation EP0471155.*
French Preliminary Search Report dated Jun. 23, 2016 in French Application 15 60069, filed on Oct. 22, 2015 ( with English translation of categories of Cited Documents and Written Opinion).
French Preliminary Search Report dated Jun. 23, 2016 in French Application 15 60069, filed Oct. 22, 2015 (with English translation of categories of Cited Documents and Written Opinion).

* cited by examiner

*Primary Examiner* — Vicky A Johnson
(74) *Attorney, Agent, or Firm* — Oblon, McClelland, Maier & Neustadt, L.L.P.

(57) ABSTRACT

A declutching device for a seed drill distribution element including a locking element and a support element on which the locking element is mounted, in which the locking element allows two stable positions relative to the support element and can be moved between these, the locking element being configured, when in a stable position, to be able to declutch the distribution element.

8 Claims, 3 Drawing Sheets

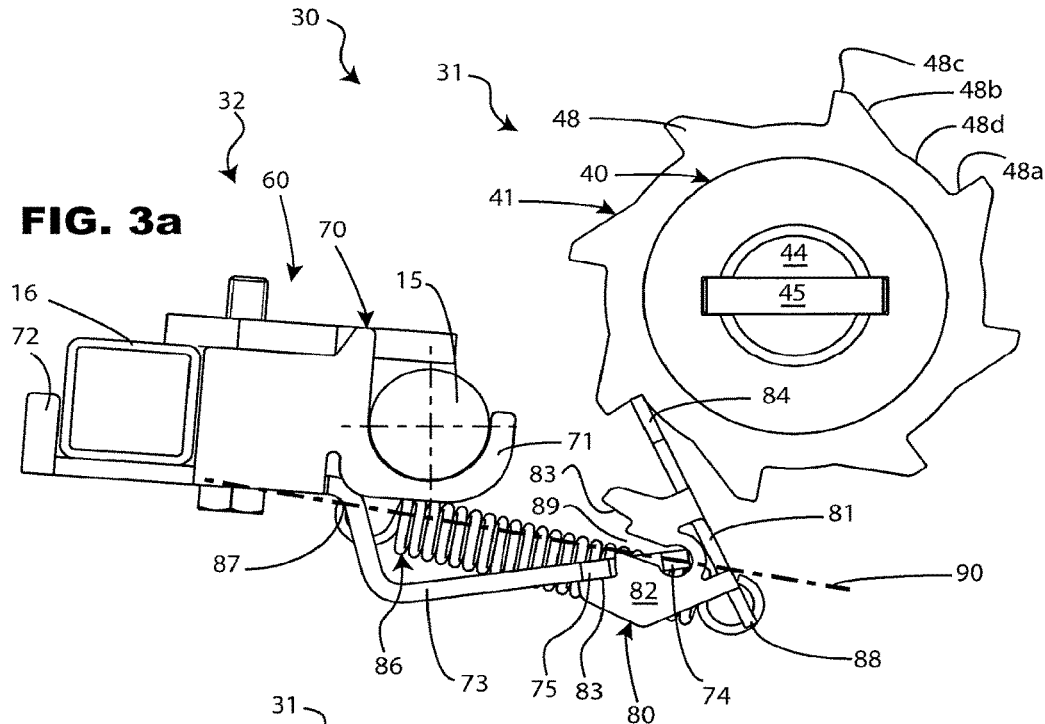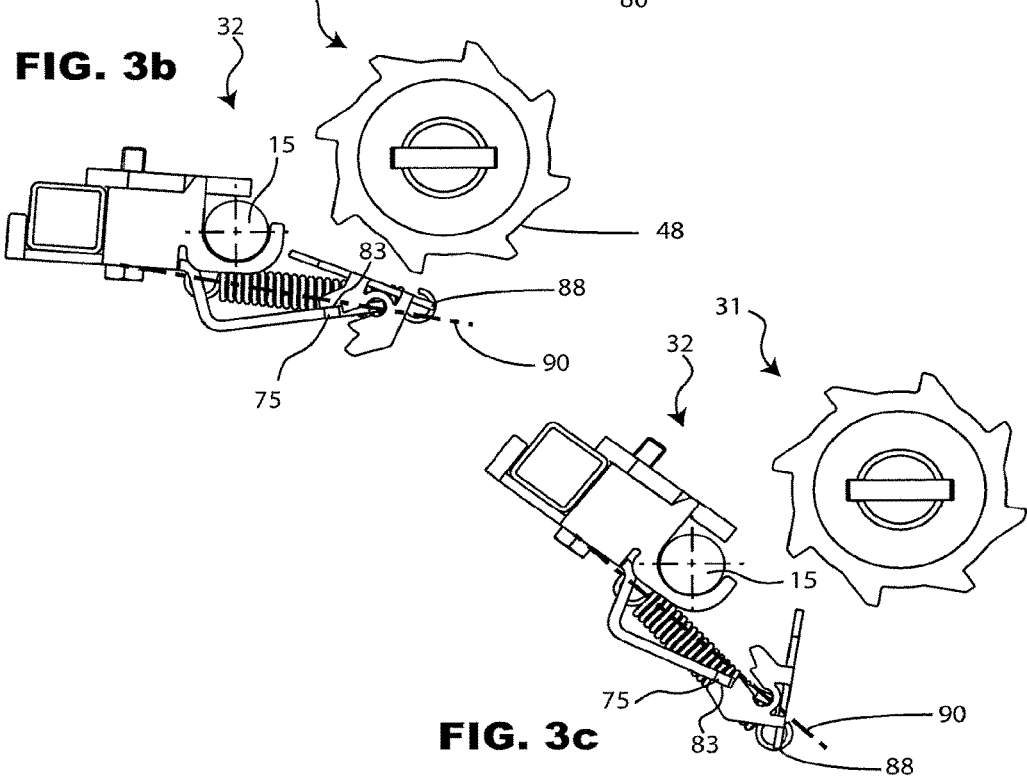

DECLUTCHING DEVICE FOR DISTRIBUTION ELEMENT AND SEED DRILL INCLUDING SUCH A DEVICE

BACKGROUND OF THE INVENTION

Field of the Invention

The present invention relates to the general technical field of agricultural machinery and in particular power seed drills. The invention more specifically concerns a declutching device for a seed distribution unit in a power seed drill.

A power seed drill includes a hopper and a plurality of distribution elements as described below. The distribution elements are arranged at the lower output of the hopper and are fed with seeds from the hopper by gravity. Each distribution element measures out the seeds before they are conveyed to a corresponding row or furrow.

Discussion of the Background

It is known that to meet a plant's needs during its growth and ensure a good yield from the field, cultivation operations involving fertilisation and plant health treatments are required after sowing. These different operations are carried out in accordance with the maturity of the plants. During sowing, the field is tramlined, i.e. parallel unsown tracks used as markers for the fertilisation and/or treatment devices are provided in the field. The tramlining is carried out by the declutching or clutching of some distribution elements. The intervals between the unsown tracks (known as tramlines) and their width are determined based on the tracks of the tractors, seeds and treatment devices, the width of the wheels of the latter and a ratio determining the width between the seed drill and the treatment devices. Cutting off the distribution to show the tracks of the treatment device prevents the plants situated in the path of the treatment device being crushed, therefore preventing seed waste.

A known distribution element 31 is shown in FIG. 2. This distribution element is arranged at the hopper lower output. Such a distribution element 31 includes a frame 36 that defines an inlet chamber for the seeds 37 ahead of and above a movable section 39 and an outlet chamber for the seeds 38 further down from and below the section 39.

The distribution element 31 also includes a hub 40, a gearwheel 41, a grooved wheel 42 and a clutching spring 43 (FIG. 2).

The hub 40 has a longitudinal body 40a and a radial ring 40b at one end of the body 40a.

The hub 40 is attached to a drive shaft 44 of the seed drill by a peg 45.

The gearwheel 41 is arranged around the hub 40.

In detail, the gearwheel 41 includes a longitudinal section 41a and a ring 41b. An annular recess 41c is provided where the sections 41a and 41b meet. A notch 41d is also provided across the section 41a.

The ring 41b has teeth 48. Each of these teeth 48 in this embodiment includes a radial surface 48a opposite a tilted surface 48b. The successive surfaces 48a and 48b are connected, on the one hand, by a top surface 48c and, on the other hand, by a bottom surface 48d (see FIG. 1 or 3a).

The gearwheel 41 is arranged concentrically around the hub 40 and the ring 40b is housed in the recess 41c (FIG. 1).

The wheel 42 includes helical splines in the embodiment shown. The splines can also be straight. Other known wheels include lugs rather than splines. In FIG. 2, the wheel 42 is attached to a block 34. An assembly including the block 34, the hub 40, the gearwheel 41 and the wheel 42 can move along a given sliding range relative to the frame 36 to adapt the spline length to the desired seed flow at the output.

A valve 35 is provided opposite the wheel 42 to adapt the distribution to the dimension of the chosen seeds (FIG. 2).

The wheel 42 has a main body 42a with splines on its outer surface and a tubular portion 42b extending longitudinally inside the body 42a.

The clutching spring 43 is helical. It includes two series of coils 43a and 43b and in this case a plurality of welded coils 43c. There are two welded coils 43c in this case, although there may be three or more. Welding the coils 43c prevents them from sliding between the hub 40 and the tubular portion 42b.

The spring 43 also includes a first lug 43d and a second lug 43e, which in this case extend longitudinally opposite each other from the first and second series of coils 43a and 43b.

The first lug 43d of the spring is housed in the notch 41d of the gearwheel 41 in order to keep the spring 43 and the wheel 41 together during rotation.

The second lug 43e comes into contact with a finger (not shown) of the wheel 42, protruding between the body 42a and the tubular portion 42b.

During seeding, the shaft 44 drives the hub 40 in rotation and drives the spring 43 by friction, the first lug 43d driving the gearwheel 41. As shown in FIG. 1, the elements 40, 41, 43 and 44 revolve in the anti-clockwise direction R. The clutching spring 43 tightens around the body 40a and the tubular portion 42b, driving the wheel 42 in rotation. The distribution element 31 is then clutched and distributes the seeds. The angular speed of the drive shaft 44 depends on input parameters such as the tractor's speed and the previously chosen gear of a gearbox linked to the shaft 44.

The distribution element 31 can also be declutched using a declutching lever 10 (FIG. 1).

The lever 10 includes a body 20, a bolt 25, a spring 26 and a buffer 27.

The body 20 of the lever 10 has first hooks 21 via which it is mounted by a pivot connection around a fixed pivot rod 15 relative to a chassis (not shown) of the seed drill. The body 20 also has second hooks 22a and 22b via which it is attached to a selection bar 16, which is here square shaped. The purpose of the bar 16 is to move the lever 10 around the rod 15 between two end positions: a retracted position and a deployed position.

The body 20 also has a tongue 23 provided with a transverse and flat edge 24 at its distal end.

The bolt 25 includes a screw 25a and a lock nut 25b. The spring 26 is a helical compression spring, for example with flat ends, i.e. arranged in a plane.

The buffer 27 is in the shape of a plate with an opening (not shown) for screws to pass in its centre.

The lever 10 is shown here with the buffer 27 mounted flat on the edge 24. More specifically, the buffer 27 is held on the edge 24 by the bolt 25 and the spring 26, such that the spring 26, the edge 24 and the lower part of the buffer 27 are kept in this order between the nut 25b and the screw head 25a. The buffer 27 has a head 28 of a larger width than the sliding range of the wheel 42 relative to the frame 36.

When the buffer 27 is mounted on the lever 10, the latter is able to declutch the distribution element 31. Indeed, when the lever 10 is in a deployed position, a head of the buffer 27 (FIG. 1) is housed between two successive teeth 48. The wheel 41 is blocked from rotating by the buffer 27. The lug 43d is prevented from turning by the wheel 41, the spring 43 is loosened and the driving of the wheel 42 by the shaft 44 is disengaged. The distribution element 31 is then declutched and the seed distribution stops.

The spring 26 provides elasticity in the event that the buffer 27 strikes one of the surfaces 48b or 48c when the lever 10 is moved into the deployed position.

According to the tractor's position in the field during sowing, the bar 16 moves the lever 10 and its buffer 27 between the retracted and deployed positions as necessary. Prior to seeding, a buffer 27 is only provided on the levers 10 opposite the elements 31 that will be declutched.

Positioning the levers, moving them between distribution elements or withdrawing them requires intervention with the use of tools before each seeding. Furthermore, the available space within seed drills is restricted. Handling and adjusting the buffers is therefore awkward. The restricted space also increases the risk of dropping parts or tools into the machine during work, which wastes time.

SUMMARY OF THE INVENTION

The purpose of the invention is to propose a simple, economical and rapid distribution unit declutching device.

The invention concerns a declutching device for a seed distribution element including a locking element and a support element on which the locking element is mounted. The locking element allows two stable positions relative to the support element and can be moved between these, one of the stable positions being an active position, the locking element being configured, when it is in the active position, to be able to declutch the distribution element.

The declutching element according to the invention has the advantage of being able to be moved with one hand and without any tools between the two stable positions. The seed drill distribution can therefore be easily and rapidly configured before each new seeding by selecting or deselecting distribution elements using declutching devices according to the invention. This is particularly relevant for operators working for different farmers during a single season. As each new plot of land may require the use of fertilisation and/or treatment devices of different widths, it may be necessary to select a different set of distribution elements.

According to an advantageous feature, when the locking element reaches one or other of the stable positions, a return element keeps the locking element in the stable position reached, and/or pulls it towards that position.

The return element is for example a tension spring or a compression spring. These types of spring have the advantage of enabling the locking element to be both forced to return to and stay in the stable positions, and enabling elasticity when the locking element strikes a protruding part of the distribution wheel when the lever is moved into the deployed position.

According to a specific embodiment, the return element is mounted on the support element at a first hitching point and on the locking element at a second hitching point.

The support element includes at least one lug forming a pivot axis, for example two, the locking element being movable in rotation between the two stable positions around the at least one lug.

Advantageously, the locking element includes two abutment surfaces substantially opposite each other, the support element including a pin, one of the abutment surfaces resting against the pin in each respective stable position. In another embodiment, it is the locking element which includes the pin, the support element then including two abutment surfaces opposite each other and the pin resting against one of the abutment surfaces in each respective stable position.

The invention also concerns a seed drill including a distribution element fitted with a declutching device as described above, the support element being movable between two end positions, including one position deployed relative to a machine chassis.

Advantageously, the distribution element is declutched by the locking element when the latter is in its active position and when the support element is in a deployed position.

BRIEF DESCRIPTION OF THE DRAWINGS

Other features and advantages of the invention will become apparent from the following description with regard to the attached drawings, which are only provided as non-limiting examples of the invention. In these drawings:

FIG. 1 is an elevation view of a declutching lever in a retracted position and of a clutched distribution element of the prior art;

FIG. 2 is a simplified longitudinal section and elevated view of the distribution element in FIG. 1 according to marker II-II;

FIG. 3a is an elevation view of a declutching lever according to the invention, in a deployed position, comprising a locking element in an active position and a distribution element in a declutched state;

FIG. 3b is an elevation view of the elements in FIG. 3a showing the locking element in an inactive position and the distribution element in a clutched state;

FIG. 3c is an elevation view of the elements in FIG. 3a showing the locking element in an active position, the lever in a retracted position and the distribution element in a clutched state;

DESCRIPTION OF THE PREFERRED EMBODIMENTS

Figure 4:
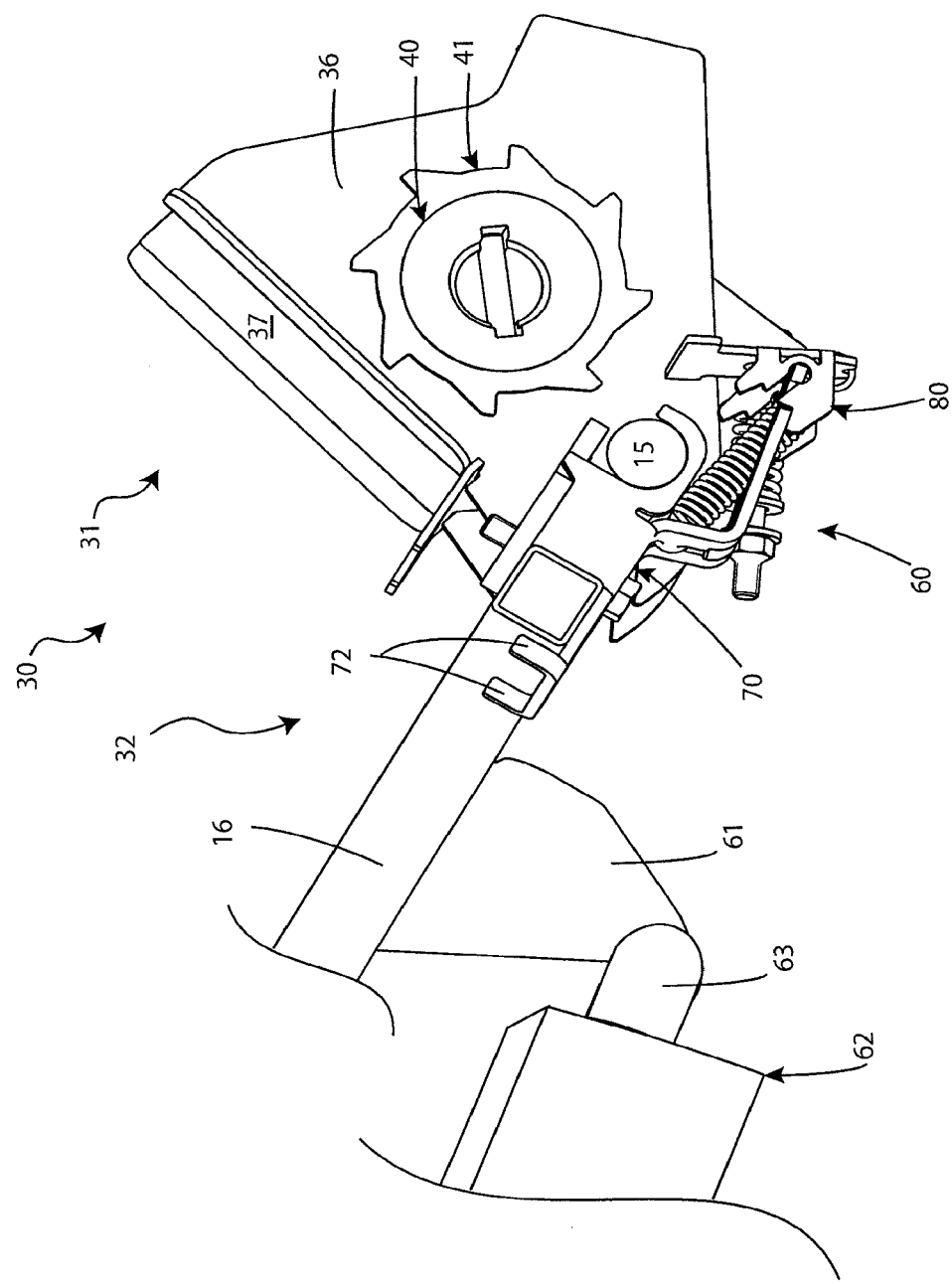
FIG. 4 is a perspective view of the elements in FIG. 3c also showing a declutching jack in a retracted position.

FIG. 3a shows the lower part of a distribution unit including a distribution element 31 and a declutching device 32.

Figures 1, 2:
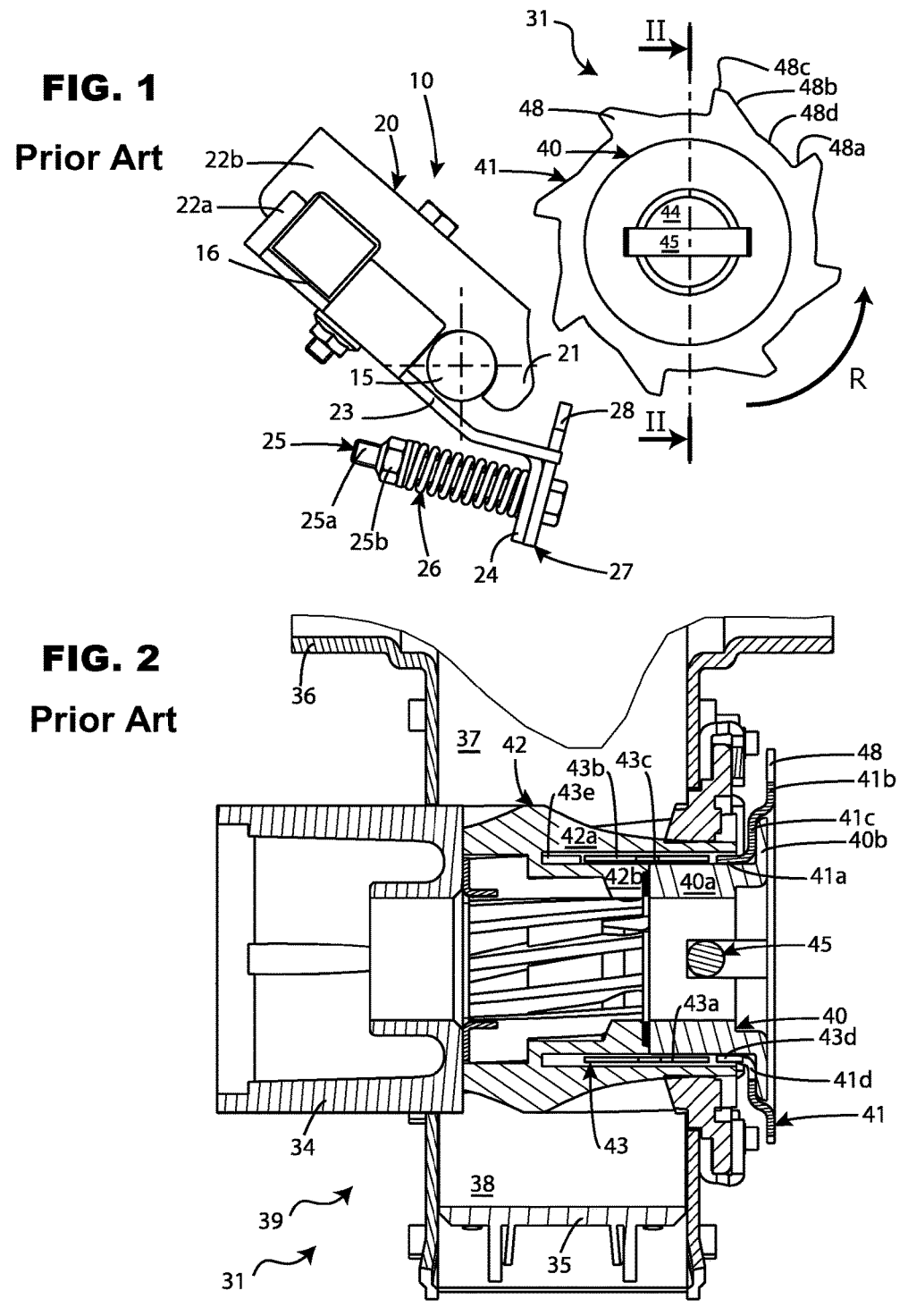

The distribution element 31 is in the disclosed embodiment of the same type as that described in the preamble to this application. For the sake of simplicity, only some components of the distribution element 31 in FIG. 2 are reproduced in FIGS. 1, 3a-3c and 4.

The declutching device 32 is described hereinafter in reference to FIGS. 3a to 3c and 4. The device 32 includes a lever 60, a tipping flange 61 and a jack 62.

The lever 60 includes a support element 70, or body, a locking element 80 and a return element 86 (see FIG. 3a in particular).

The body 70 has two pairs of hooks 71 and 72 on either side. The first and second hooks 71 and 72 respectively keep the lever 60 on a pivot rod 15 and on a bar 16 of the seed drill.

The lever 60 is attached to the end of the rod 63 of the jack 62 via the tipping flange 61. The jack 62 is for example connected to a chassis (not shown) of the seed drill. Due to the translatory movement of the rod 63, the bar 16 and consequently the lever 60 can be moved between a retracted position and a deployed position around the pivot rod 15.

The body 70 also includes a protruding tongue 73. The tongue 73 has side lugs 74 on either side of its distal end. The tongue 73 also has a pair of stops 75 or stop teeth on either side, set back from the distal end relative to the side lugs 74.

The locking element 80 is in this case a wedge. This wedge 80 includes a central flange 81 and two side flanges 82 or blocking stirrups. Preferably, the flanges 81 and 82 are formed of one part. Other embodiments are conceivable, for example welding the stirrups 82 onto the central flange 81.

The blocking stirrups 82 are substantially U-shaped. Each stirrup 82 includes two abutment surfaces 83 opposite each other and each on a respective branch of the stirrup. The stirrups 82 are attached on either side of the central flange 81.

The return element 86 is in this case a helical tension spring with a hitching loop for attachment at each end.

The wedge 80 is mounted in a movable fashion on the tongue 73 so that each stirrup 82 is mounted on a respective lug 74, with the central flange 81 opposite the distal end. The wedge 80 can swivel around the lugs 74 between two stable positions determined by at least one of the abutment surfaces 83 coming into contact against the stop 75.

Advantageously, a corridor 89 is in this case positioned between the abutment surfaces 83 to make it easier to mount the wedge 80 on the body 70 (FIG. 3a). The minimum width of the corridors 89 is greater than the smallest thickness of the lugs 74. As such, the stirrups 82 can be mounted on the lugs 74 by sliding the lugs 74 in the corridors 89.

Alternatively, the corridors are absent and the wedge is assembled on the body 70 in another manner, for example by folding the stirrups 82 on either side of the tongue 73.

The spring 86 is mounted stretched out on the lever 60 by its end loops at two hitching points 87 and 88. The first hitching point 87 is in this case situated where the body 70 and the tongue 73 meet. The second hitching point 88 is on the wedge 80, in this case at one end of the central flange 81, substantially in a median plane between the stirrups 82. The spring 86 constantly pulls the second hitching point 88 of the wedge 80 towards the body 70. As such, the wedge 80 is forced by the spring 86 to move towards one or other of two stable positions of the wedge relative to the body 70: an active position and an inactive position. Return element is taken to mean "element for returning to one or other of the stable positions". The movement of the wedge 80 towards one or other of the stable positions depends on the side on which the second hitching point 88 is located relative to a median plane 90 defined by the first hitching point 87 and the two lugs 74. As such, when the second hitching point 88 is in the median plane 90, the spring 86 is stretched to the maximum. When the wedge 80 is in one or other of the stable positions, the spring 86 holds it there.

The spring 86 also lends elasticity to the wedge 80 in the event that the latter strikes one of the surfaces 48b or 48c when the lever 60 moves from the retracted position (FIG. 3c) to the deployed position (FIG. 3a). As the wheel 41 is driven in rotation when the distribution element 31 is clutched, the end part 84 of the wedge 80 can slide against the surfaces 48c, 48b then 48d until the portion 84 comes to rest against the radial surface 48a and the distribution element 31 is declutched. This prevents damage to the wedge 80, the lever 60 and the teeth 48.

In the embodiment shown, the inactive position corresponds to that of the end positions of the wedge 80 in which the flange 81 is the closest to the body 70 (FIG. 3b). Conversely, the active position corresponds to the position in which the flange 81 is the furthest away from the body 70 (FIGS. 3a and 3c).

A simple manual effort is sufficient to move the wedge from one stable position to the other. As such, compared with the known lever 10, on which the mounting and removal of a buffer 27 requires the use of tools, the lever 60 has the advantage of not requiring the use of tools. This results in far simpler adjustments and in a far shorter period of time. Furthermore, the risk of losing tools or parts in the restricted space of the machine is eliminated.

The distribution element 31 is only declutched when the wedge 80 is in an active position and the lever 60 is in a deployed position. To declutch a distribution element 31, it is therefore necessary, with the lever 60 in a retracted position, to move the wedge 80 to its active position (the distribution element 31 is then always clutched), then to move the lever 60 to its deployed position. Conversely, to clutch a distribution element 31, one only needs to move the lever 60 to its retracted position. The wedge 80 can then be moved to an inactive position.

Depending on the machine, the number of levers 60 per semi-seed drill, i.e. per side of the machine, varies. This number may be comprised between one and six per semi-seed drill or even higher. The higher the number of levers 60, the more time is saved when adjusting the seed drill. This is particularly relevant for operators working with their machines for numerous different farmers each season, as the machines need to be adjusted for each new task.

In a variant not shown, a seed drill can be fitted with one or several lever(s) 60 on one side only, the other side not having any. This is financially advantageous when the tramlines are made asymmetrically, i.e. when the two tracks of the same tramline are produced during two successive passes: one track on the outbound route and one track on the return route.

Before each seeding, each of the wedges 80 must be adjusted by moving it to its active or inactive position as appropriate. According to the seed drill's position in the field, on each semi-seed drill, the jack 62, the bar 16 and the corresponding levers 60 will be moved to their retracted or deployed position. Those of the levers 60 whose wedge 80 is in an active position (FIG. 3a) then declutch the respective distribution elements 31, which stop distributing seed in the corresponding rows. These rows form tramline tracks that the wheels of the treatment devices can travel over. Conversely, the levers 60 whose wedge 80 is in an inactive position leave the distribution elements 31 in a clutched state and continue to distribute seed.

Other embodiments are possible without departing from the framework of the invention.

For example, in an alternative embodiment (not shown), the tongue 73 includes at least one stirrup with two abutment surfaces facing each other, the wedge 80 includes a flange with a protruding lug that rests respectively against one or other of the abutment surfaces depending on the stable position of the wedge 80.

In other words, a first one from the support element 70 or the locking element 80 includes two abutment surfaces 83 substantially opposite each other, and the other from the support element 70 or the locking element 80 includes a pin 75, one of the abutment surfaces 83 resting against the pin 75 in each respective stable position.

In another variant not shown, the tension spring 86 is substituted by a compression spring. The compression spring can be mounted on a brace rod limiting its transverse deformation. The compression spring is mounted at its ends on hitching points positioned respectively on the body and on the wedge, so as to force the wedge to move to one of its two stable positions.

What is claimed as new and desired to be secured by Letters Patent of the United States is:

1. A declutching device for a seed drill distribution element, comprising:
   a locking element including first and second abutment surfaces; and a support element including at least one lug on which the locking element is rotatably mounted, wherein the lug is posited between the first abutment surface and the second abutment surface, and wherein the locking element allows two stable positions relative to the support element and can be moved between the two stable positions, the two stable positions including:

an active position in which the first abutment surface of the locking element directly contacts the support element, the locking element being configured, when in the active position, to be able to declutch the distribution element, and an inactive position in which the second abutment surface of the locking element directly contacts the support element.

2. The declutching device according to claim 1, including a return element that, when the locking element reaches the active position or the inactive position of the two stable positions, keeps the locking element in the active position or the inactive position reached, and/or pulls the locking element towards the active position or the inactive position.

3. The declutching device according to claim 2, the return element being a tension spring.

4. The declutching device according to claim 2, the return element being mounted respectively on the support element at a first hitching point and on the locking element at a second hitching point.

5. The declutching device according to claim 1, the support element including a pin spaced apart from the lug, the first abutment surface resting against the pin in the active position and the second abutment surface resting against the pin in the inactive position.

6. A seed drill comprising:

a distribution element fitted with the declutching device according to claim 1, the support device being movable between two end positions relative to a machine chassis, one of the end positions being a deployed position.

7. The seed drill according to claim 6, the distribution element being declutched by the locking element when the latter is in the active position and when the support element is in the deployed position.

8. The declutching device according to claim 1, wherein the support element includes a protruding tongue and the at least one lug includes first and second lugs protruding from opposite sides of a distal end of the protruding tongue.

* * * * *